United States Patent Office 3,527,566
Patented Sept. 8, 1970

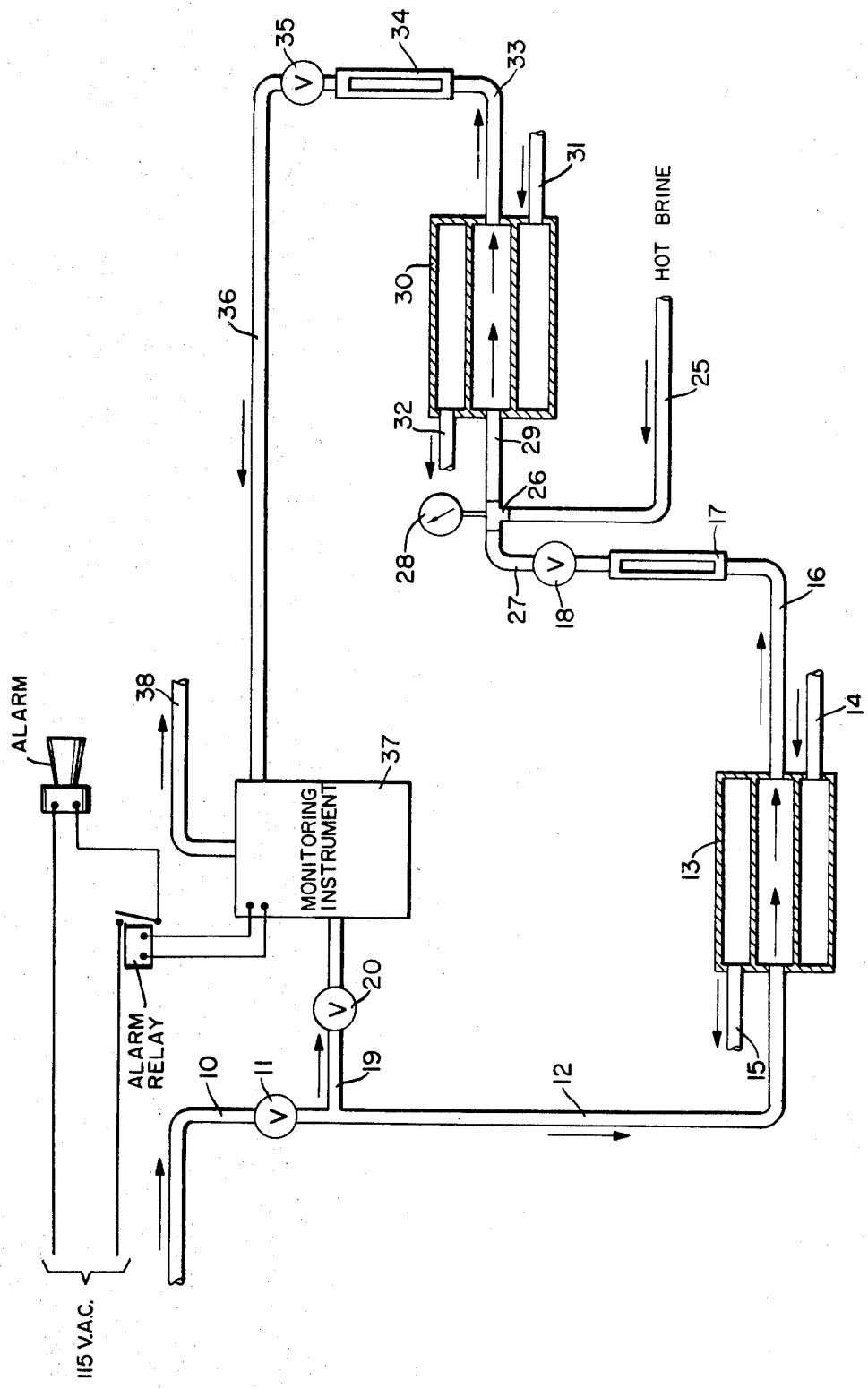

3,527,566
PROCESS AND APPARATUS FOR MONITORING CALCIUM CONTENT OF BRINE TO ELECTROLYTIC CELLS
Clarence I. Glassbrook, Baton Rouge, La., assignor to Ethyl Corporation, New York, N.Y., a corporation of Virginia
Filed Mar. 31, 1966, Ser. No. 539,108
Int. Cl. B01k *3/00;* G01n *31/22, 33/18*
U.S. Cl. 23—230          11 Claims

ABSTRACT OF THE DISCLOSURE

Process for monitoring the calcium content of an aqueous solution of sodium chloride without precipitating any of the sodium chloride by continuously controlling the flow rate of zero-hardness water to a mixing means supplied with a continuous source of saturated aqueous brine solution and continuously controlling the flow rate of the resulting mixture of saturated aqueous brine solution and zero-hardness water at a flow rate greater than said flow rate of zero-hardness water and analyzing the resulting mixture for calcium content.

---

This invention pertains to a process and apparatus for monitoring the impurity content of salt solutions, and more particularly, this invention pertains to a process and apparatus for monitoring the calcium content of saturated sodium chloride brine solutions.

As is well known in the art, one of the commercial methods for the manufacture of chloride is by the use of an electrolytic process commonly described as a caustic-chlorine process. In the so-called caustic-chlorine electrolytic process for the manufacture of chlorine, a saturated aqueous solution of sodium chloride is fed continuously to an anolyte chamber of an electrolytic cell upon which direct current is impressed; the solution passes through a porous diaphragm into the catholyte chamber; and then subsequently overflows from the catholyte chamber. In operation of this process, chlorine gas is evolved at the anode, hydrogen is evolved at the cathode, and the overflowing catholyte comprises an aqueous solution of sodium chloride and sodium hydroxide generally in a concentration of approximately 85 percent sodium chloride and approximately 15 percent sodium hydroxide.

During operation of a cell, the pH of the anolyte is approximately 3 and that of the catholyte is approximately 14. The pH change from strongly acid to strongly alkaline is at the porous diaphragm separating the anolyte and catholyte chambers of the cell.

The porous diaphragm is generally a foraminous metal member such as a steel screen covered with an insulating material such as asbestos, and one of the major operational problems for commercial caustic-chlorine cells is the blocking of the porous diaphragm with precipitated or foreign material. When such blocking occurs a cell must be shut down and a new diaphragm inserted.

One of the major causes of blocking is the precipitation of calcium oxide in the diaphragm openings. The calcium oxide results from calcium in the brine solution, and calcium is very soluble in the cell electrolyte at the acid pH's of the anolyte. As the electrolyte solution pH changes through a neutral pH of 6 to 8 in its path through the diaphragm to the catholyte chamber, the calcium precipitates out of solution as calcium oxide or hydroxide and collects in the diaphragm openings causing blocking. Although certain methods have been devised to prevent the blocking of the diaphragm, such as the addition of sugar to the electrolyte, no completely successful method has been determined for the prevention of diaphragm blocking if calcium is present in the hot saturated sodium chloride brine solution being fed to the anolyte chamber.

For economic reasons and suitable operation of a caustic-chlorine cell, the sodium chlorine brine solution being fed to the cell should be a hot saturated aqueous solution of sodium chloride, and the determination of the calcium content of such a saturated solution is extremely difficult because any attempt to perform analytical procedures on the hot saturated brine generally causes a change in temperature of the brine solution, and with such a temperature change salt immediately precipitates on apparatus, equipment, valves and other locations causing plugs in sampling lines and sampling valves which prevent analysis of the solution.

An object of this invention is to provide a process and apparatus for determining the calcium content of hot saturated aqueous brine solutions. Another object of this invention is to provide a process and apparatus for determining the calcium content of hot saturated aqueous solutions of sodium chloride on a continuous basis. A further object of this invention is to provide an apparatus and process for continuously monitoring the calcium content of hot saturated aqueous solutions of sodium chloride in a simple and economical manner.

These and other objects will become apparent from the following description of the process and apparatus of this invention wherein the figure is a schematic flow diagram of the process which also identifies component apparatus parts.

Referring now to the figure, steam enters the apparatus through line 10 and valve 11 to line 12 leading to heat exchanger 13 which condenses the steam and prepares zero-hardness water. Suitable cooling water inlet 14 and outlet 15 are provided on condenser 13. Zero-hardness water leaves condenser 13 by line 16 and passes through rotameter 17 wherein the flow of zero-hardness water may be observed and controlled by valve 18.

Saturated aqueous brine solution enters the apparatus of the invention by line 25 to cross 26 where the brine is diluted with zero-hardness water entering from line 27. Suitable pressure gauge 28 may be provided in an opening of cross 26 opposite the brine entry location. The mixture of saturated brine solution and zero-hardness water proceeds by line 29 to cooler 30 where the diluted brine solution may be cooled without precipitation of salt. Suitable cooling water inlet 31 and outlet 32 are provided on cooler 30. The cooled brine zero-hardness water solution exits cooler 30 by line 33 to rotameter 34 wherein the flow may be observed and controlled by valve 35 and the controlled flow of brine zero-hardness water solution proceeds by line 36 to suitable calcium determination instrument 37 where the quantity of calcium in the brine solution may be determined by any suitable method on a continuous basis. The solution which has been monitored for calcium content exits from instrument 37 by line 38 to waste disposal not shown.

Instrument 37 may be heated by steam from line 12 through line 19 and the volume thereof to the instrument may be controlled by valve 20.

As can be seen from the above description of the apparatus of this invention, brine may be sampled on a continuous basis from a brine supply line to caustic-chlorine cells by means of line 25, and the flow of brine may be controlled in an exact manner by controlling the quantity of the mixture of zero-hardness water and brine solution exiting cooler 30 by means of valve 35 at a rate in excess of the rate of zero-hardness water entering mixing cross 26 as controlled by valve 18. In this manner no direct control valves or other means are necessary to obtain a controlled sample of hot saturated aqueous brine solution.

The continuous process of this invention for controlling the dilution of a saturated aqueous brine solution without precipitation of the brine component comprising, in combination, (a) continuously controlling the flow rate of zero-hardness water to a mixing means supplied with a continuous source of saturated aqueous brine solution; and (b) continuously controlling the flow rate of the resulting mixture of saturated aqueous brine solution and zero-hardness water at a flow rate greater than said flow rate of zero-hardness water may be described best by the following example.

In an apparatus as described previously, steam at a pressure of 40 p.s.i.g. was supplied through one-quarter inch copper tubing to a zero-hardness water condenser comprising approximately 20 feet of one-quarter inch copper tubing in a water bath. Sufficent water was supplied to the bath countercurrently to the flow direction of the entering steam so that only liquid water exited the condenser. The zero-hardness water was controlled at a flow rate of 25 cc. per minute to a cross connecting the zero-hardness water line to a brine sampling line. The hot aqueous brine solution to be diluted was saturated with sodium chloride at a temperature of 150° F. The mixture of brine solution and zero-hardness water exiting the cross was cooled to substantially ambient temperature in a cooling bath substantially identical with the zero-hardness water condenser, and then passed through a rotameter and valve for controlling the flow rate of the cooled mixture at 50 cc. per minute. In this manner a one to one dilution of the hot aqueous brine solution was obtained without any valving or other temperature changing restrictions in the hot aqueous brine sampling line.

The cooled diluted mixture was then fed to a calcium monitoring instrument which was a hardness monitor identified as CR Hardness Monitor, Model 1121, as supplied by Hach Chemical Company. The analysis for calcium was performed colorimetrically in the instrument through the continuous addition of a buffer-indicator solution to the continuously flowing sample of dilute mixture to the instrument. The buffer-indicator solution was one which indicated blue when the mixture contained less than a prescribed quantity of calcium and red when more than the prescribed amount of calcium was present. The buffer-indicator solution in the instrument contained a suitable quantity of ethylene diamine tetraacetic acid hardness sequestering agent so that the hardness monitor would alarm at 5 parts per million calcium. Because of the 1:1 ratio dilution as set by the flow rates in the rotameters of 25 cc. and 50 cc., respectively, this meant that the alarm was set for a 10 parts per million concentration of calcium in the saturated brine solution. It is clear, however, that changes in the quantity of ethylene diamine tetraacetic acid hardness sequestering agent can be made so that the hardness monitor will alarm at other concentrations such as 1, 2.5, 7.5, 10, 15, 20 and 40 parts per million as needed or desired.

In operation, the hardness meter projects a beam of light through a prepared water sample in a sample cell, then through a light duct and then through a red color filter and on to a filter cell. As can be seen, when the sample contains more hardness than is desired a red color develops and a photocell is activated which in turn activates a panel meter and alarm relay. The monitoring instrument as used in this example functions at a controlled level of calcium content and did not attempt to show the actual parts per million hardness that might be present; however, it is clear that any other suitable analyzing or monitoring instrument may be used as desired.

It is clear also that other flow rates of zero-hardness water and of the resulting mixture of zero-hardness water may be used as long as the flow rate of the resulting mixture is in excess of the flow rate of the zero-hardness water. A preferred flow rate range which has been found to provide proper dilution of the hot saturated brine solution without precipitation is one wherein the flow rate of the resulting mixture is from greater than 1 to about 3 times the flow rate of zero-hardness water, and a more preferred flow rate range is one wherein the flow rate of the resulting mixture is from about 1.5 to about 2.5 times the flow rate of zero-hardness water.

The advantages of the apparatus and process of this invention are clearly apparent. Hot aqueous brine solutions may be monitored on a continuous basis for a deleterious component, and the operation of the primary apparatus, the electrolytic cells, stopped prior to damage from a deleterious component of the brine solution.

When using the process and apparatus of this invention for monitoring hot saturated aqueous solutions of sodium chloride, the calcium content of the sodium chloride solution may be monitored on a continuous basis so that damage to the caustic-chlorine cells may be prevented. It is clear also that the process and apparatus of this invention provides a simple and economic means for monitoring of saturated brine solutions which was not heretofore available.

What is claimed is:

1. A continuous process for controlling the dilution of a saturated aqueous brine solution without precipitating salt by avoiding valve control means on the solution comprising, in combination,
   (a) continuously controlling the flow rate of zero-hardness water to a mixing means supplied with a valve-free continuous source of said saturated aqueous brine solution; and
   (b) continuously controlling the flow rate of the resulting mixture of saturated aqueous brine solution and zero-hardness water at a flow rate greater than said flow rate of zero-hardness water.

2. Process of claim 1 further characterized by said saturated aqueous brine solution being at a temperature greater than ambient temperature and said resulting mixture being cooled to substantially ambient temperature.

3. Process of claim 1 further characterized by said zero-hardness water being prepared by condensing steam.

4. Process of claim 1 further characterized by said flow rate of said resulting mixture being from greater than one to about three times said flow rate of zero-hardness water.

5. A continuous process for monitoring the calcium content of a saturated aqueous solution of sodium chloride without precipitating the sodium chloride by avoiding valve control means on the solution which is saturated at a temperature in excess of ambient temperature comprising, in combination,
   (a) providing a continuous valve-free sampling source of the aqueous solution to a mixing means;
   (b) controlling the flow rate of zero-hardness water to said mixing means;
   (c) controlling the flow rate of the resulting mixture of zero-hardness water and aqueous solution from said mixing means at a flow rate in excess of said flow rate of zero-hardness water;
   (d) continuously monitoring the controlled flow rate of said resulting mixture by an analyzing means for calcium.

6. The process of claim 5 further characterized by said analyzing means being a colorimetric apparatus.

7. The process of claim 6 further characterized by an alarm means operably connected with said analyzing means.

8. An apparatus for controlling the dilution of saturated aqueous brine solution without precipitating salt by avoiding valve control means on the solution comprising, in combination,
   (a) means for supplying zero-hardness water to a solution mixing means;
   (b) means for supplying said saturated aqueous brine solution to said solution mixing means;

(c) means for controlling the flow rate of said zero-hardness water to said solution mixing means; and (d) means for controlling the flow rate of the resulting solution from said solution mixing means at a flow rate in excess of said flow rate of zero-hardness water.

9. An apparatus for monitoring the calcium content of a saturated aqueous solution of sodium chloride without precipitating the sodium chloride by avoiding valve control means on the solution which is saturated at a temperature in excess of ambient temperature comprising, in combination, (a) means for supplying zero-hardness water to a solution mixing means;

(b) means for supplying said saturated aqueous solution to said solution mixing means;

(c) means for controlling the flow rate of said zero-hardness water to said solution mixing means;

(d) means for controlling the flow rate of the resulting diluted sodium chloride solution from said solution mixing means at a flow rate in excess of said flow rate of zero-hardness water; and (e) monitoring means for continuously analyzing said resulting diluted sodium chloride solution from said solution mixing means for calcium.

10. Apparatus of claim 9 further characterized by said monitoring means being a colorimetric analyzer.

11. Apparatus of claim 9 further characterized by said monitoring means comprising an analyzing means and an alarm means operably connected with said analyzing means for providing an alarm when the analysis for calcium reports a value in excess of a predetermined value.

References Cited

UNITED STATES PATENTS

| 2,758,610 | 8/1956 | Hively | 137—605 |
|---|---|---|---|
| 3,217,711 | 11/1965 | Pecina et al. | 137—605 XR |
| 2,876,182 | 3/1959 | Hopper et al. | 204—99 |

FOREIGN PATENTS 1,150,226   6/1963   Germany.

OTHER REFERENCES

The Industrial Chemist, November 1959, pp. 533–4.

MORRIS O. WOLK, Primary Examiner

R. M. REESE, Assistant Examiner

U.S. Cl. X.R.

23—253; 204—232